United States Patent [19]

Yoshioka

[11] 4,383,574
[45] May 17, 1983

[54] AIR CONDITIONING SYSTEM FOR AUTOMOTIVE VEHICLES HAVING DISCHARGE AIR TEMPERATURE CONTROL FUNCTION

[75] Inventor: Hisato Yoshioka, Konan, Japan

[73] Assignee: Diesel Kiki Co., Ltd., Tokyo, Japan

[21] Appl. No.: 215,754

[22] Filed: Dec. 12, 1980

[30] Foreign Application Priority Data

Dec. 29, 1979 [JP] Japan .................. 54-182504[U]

[51] Int. Cl.³ .................. F25B 27/00; B60H 3/00
[52] U.S. Cl. ........................ 165/43; 165/25; 62/323.4
[58] Field of Search ............ 165/41–43, 165/24, 25, 21; 236/44 R, 44 A; 98/2.11; 62/228 B, 228 C, 323.4, 224, 223

[56] References Cited

U.S. PATENT DOCUMENTS

| 1,827,099 | 10/1931 | Otis | 165/21 |
| 3,490,518 | 1/1970 | Herbon | 165/42 |
| 4,337,818 | 7/1982 | Franz | 62/323.4 |

FOREIGN PATENT DOCUMENTS 1286811 8/1972 United Kingdom ........... 165/43

Primary Examiner—Albert J. Makay
Assistant Examiner—Harry Tanner
Attorney, Agent, or Firm—Frishauf, Holtz, Goodman & Woodward

[57] ABSTRACT

An air conditioning system for automotive vehicles, which includes a temperature control lever connected to the air-mix damper, and means for controlling the operation of the compressor. The air-mix damper is pivotally displaced between its maximum cooling position and its maximum heating position as the temperature control lever is moved between its predetermined intermediate position and its maximum heating position, while the damper is always held at its maximum cooling position so long as the lever is positioned between its intermediate position and its maximum cooling position. The compressor-operation control means is kept inoperative when the temperature control lever is positioned between its intermediate position and its maximum heating position, while it drives the compressor with its rate of operation varying with a change in the position of the lever when the lever is positioned between its predetermined intermediate position and its maximum cooling position.

5 Claims, 6 Drawing Figures

AIR CONDITIONING SYSTEM FOR AUTOMOTIVE VEHICLES HAVING DISCHARGE AIR TEMPERATURE CONTROL FUNCTION

BACKGROUND OF THE INVENTION

This invention relates to an air conditioning system for automotive vehicles, and more particularly to improvements in the discharge air temperature control device used in an air conditioning system of the reheat air-mix type.

In a conventional air conditioning system of the so-called reheat air-mix type for use in automotive vehicles, a heater core is arranged at a location downstream of an evaporator core which is connected to a compressor, with an air-mix damper located in the vicinity of the heater core. During cooling operation, compressed refrigerant is supplied from the compressor and evaporated by the evaporator core. The angular position of the air-mix damper determines the mixture ratio of cooled air supplied from the evaporator core through a by-pass passage bypassing the heater core to hot air produced by heating part of the cooled air from the evaporator core, with the heater core. The discharge air temperature can be controlled by changing the above mixture ratio.

According to this conventional air conditioning system of the reheat air-mix type, particularly during cooling operation the compressor is always driven so that the evaporator core operates at maximum capacity, and part of the cooled air supplied from the evaporator core is heated by the heater core.

However, it is wasteful to refrigerate air and then heat the resulting cooled air, which results in a waste of a great deal of energy by the whole air conditioning system.

OBJECT AND SUMMARY OF THE INVENTION

It is an object of the invention to provide an air conditioning system for automotive vehicles, which is capable of controlling the rate of operation of the compressor so as to obtain a desired discharge air temperature if the desired discharge air temperature is within a lower range, while if the desired discharge air temperature is within a higher range, the discharge air temperature control is effected only by varying the angular position of the air-mix damper with the compressor kept inoperative, to thereby avoid a waste of a great deal of energy.

According to the air conditioning system for automotive vehicles of the present invention, a temperature control lever is arranged for pivoting between a first extreme position and a second extreme position with a predetermined intermediate position intervening therebetween, and is operatively connected to an air-mix damper. The air-mix damper is adapted to be pivotally displaced to guide an air flow from an evaporator core, through a by-pass passage alone, which bypasses a heater core, at its first angular position, through the heater core alone at its second angular position, and through both the by-pass passage and the heater core at a position between the first and second angular positions, respectively. The air-mix damper is adapted to be pivotally displaced between the first and second angular positions as the temperature control lever is moved between the predetermined intermediate position and the first extreme position, and is adapted to be always held at the first angular position when the lever is moved between the predetermined intermediate position and the second extreme position. Further, compressor-operation control means is operatively connected to the temperature control lever, which is adapted to be kept inoperative to keep the compressor at rest when the temperature control lever is positioned between the predetermined intermediate position and the first extreme position, and is adapted to vary the rate of operation of the compressor with movement of the temperature control lever between the predetermined intermediate position and the second extreme position.

The above and other objects, features and advantages of the invention will be more apparent from the ensuing detailed description taken in connection with the accompanying drawings, in which:

DETAILED DESCRIPTION

Figure 1:
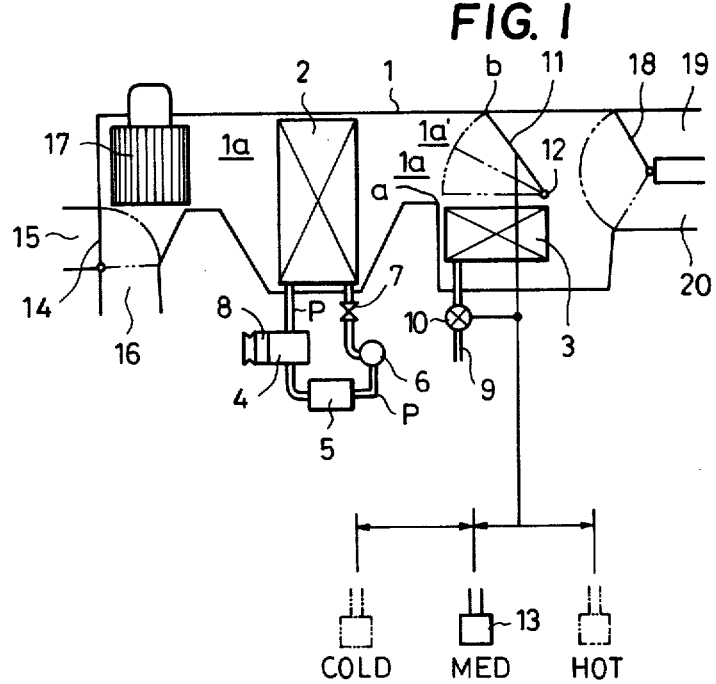
FIG. 1 is a schematic view of an air conditioning system according to an embodiment of the invention.

Referring now to the drawings, there is illustrated an embodiment of the invention. FIG. 1 illustrates an air conditioning system for automotive vehicles, which is of the reheat air-mix type. Reference numeral 1 designates a casing within which is defined an air passage 1a. An evaporator core 2, which serves to refrigerate suction air, is arranged in the air passage 1a, and a heater core 3 at a location downstream of the evaporator core 2, respectively. Connected in series through pipes P to the evaporator core 2 are a compressor 4 for compressing refrigerant, a condenser 5, a receiver tank 6 and an expansion valve 7. These devices are rendered operative or inoperative by clutching on or off a magnetic clutch 8 arranged for coupling with the drive shaft, not shown, of the compressor 4. According to the invention, control of the rate of operation of the compressor 4 is made by varying the duty factor of drive pulses being applied to the solenoid of the magnetic clutch 8, as hereinafter described.

The heater core 3 serves to heat all or part of the cooled air supplied from the evaporator core 2. An inlet pipe 9, is arranged in communication with the heat exchange tubes, not shown, which are provided within the heater core 3, through which pipe thermal medium such as engine cooling water is supplied to the heat exchange tubes for heat exchange with cooled air. The inlet pipe 9 is provided with a cock 10 arranged across it, which can be rotated to control the flow rate of cooling water being supplied into the heater core 3. In this embodiment, the opening of the cock 10 is controlled in proportion to the angular position of the air-mix damper 11 which will be described hereinafter.

The air-mix damper 11 is arranged at a location upstream of the heater core 3 in a manner traversing a by-pass passage 1a' formed in the air passage 1 and by-passing the heater core 3. The damper 11 is pivotable about its support 12 from the maximum cooling position a to the maximum heating position b or vice versa to vary the opening of the air inlet of the heater core 3. The damper 11 is connected to a temperature control lever 13 for pivoting in response to the movement of the temperature control lever 13. More specifically, as the lever 13 is moved from the intermediate position MED to the maximum heating position HOT shown in FIG. 1, the damper 11 is also moved in unison with the movement of the former so that it is positioned at the maximum heating position b with the lever 13 positioned at the position HOT, and at the maximum cooling position a with the lever 13 at the position MED, respectively. The air-mix damper 11 and the temperature control lever 13 can be connected to each other by mechanical means such as a wire, or by an electric means such as detects the position of the lever 13 to feed the resulting detected value signal to an actuator for rotating the air-mix damper 11, or by any other suitable means.

Arranged at a location upstream of the evaporator core 2 in the air passage 1a is an inside air/outside air change-over door 14 which selectively opens or closes an inside air inlet 15 and an outside air inlet 16, depending on its angular position. A blower 17 is arranged in the air passage 1a at a location downstream of the inlets 15, 16, for introducing air through selected one of the inside air inlet 15 and the outside air inlet 16 to feed same to the evaporator core 2. On the other hand, a mode change-over door 18 is arranged in the passage 1a at a location downstream of the heater core 3 and the air-mix damper 11, for selectively opening an upper air outlet 19 and a floor air outlet 20 both formed in the casing 1 to allow temperature-controlled air to be blown out through the selected outlet.

Figure 2:
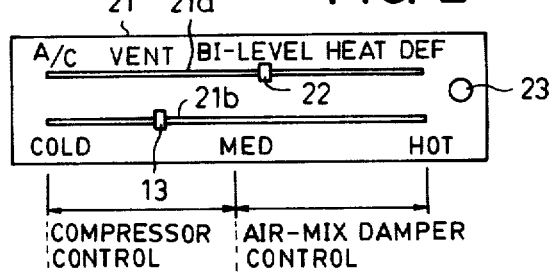
FIG. 2 is a front view of a control panel of the system of FIG. 1.

FIG. 2 illustrates a control panel 21 used in the system in FIG. 1. The control panel 21 is formed with an upper horizontal slit 21a in which a mode control lever 22 is slidably engaged, and a lower horizontal slit 21b in which the temperature control lever 13 is slidably engaged.

The mode control lever 22 is connected to the inside air/outside air change-over door 14 and the mode change-over door 18 for movement therewith to select, depending on its position along the upper horizontal slit 21a in the control panel 21, cooler mode A/C, blower mode VENT, bi-level mode BI-LEVEL, heater mode HEAT and defroster mode DEF.

Figure 3:
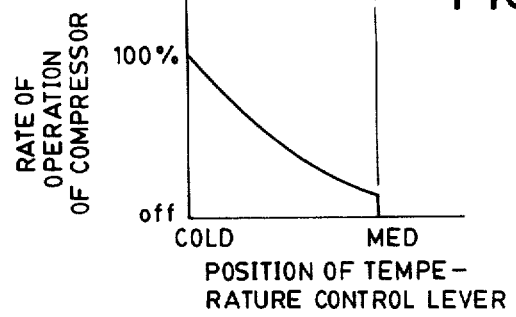
FIG. 3 is a graph showing the relationship between the position of the temperature control lever used in the system of FIG. 1 and the rate of operation of the compressor used in same.

The temperature control lever 13 is adapted to be positioned at the maximum cooling position COLD, the intermediate position MED or the maximum heating position HOT, depending on its position along the lower horizontal slit 21b in the control panel 21. So long as the temperature control lever 13 is positioned on the side of the maximum heating position HOT with respect to the intermediate position MED, the air-mix damper 11 is pivoted in unison with the movement of the lever 13, while so long as the lever 13 is positioned on the side of the maximum cooling position COLD with respect to the intermediate position MED control of the rate of operation of the compressor is effected in a manner shown in FIG. 3. The manner of control of the rate of operation of the compressor is such that the magnetic clutch 8 on the compressor 4 is off when the lever 13 is positioned between the maximum heating position HOT and the intermediate position MED, and is turned on as the lever 13 is moved toward the maximum cooling position COLD, and the duty factor U of the solenoid drive pulses which will be described hereinafter varies with the movement of the lever 13 between the position MED and the position HOT in such a manner that it is 50% with the lever 13 at the middle point between the position MED and the position COLD, and 100% with the lever 13 at the position COLD.

The control panel 21 is provided with a dehumidifying switch 23 which, when turned on, acts to cause rotation of the compressor 4 for dehumidifying action even when the temperature control lever 13 is positioned between the intermediate position MED and the maximum heating position HOT.

Figure 4:
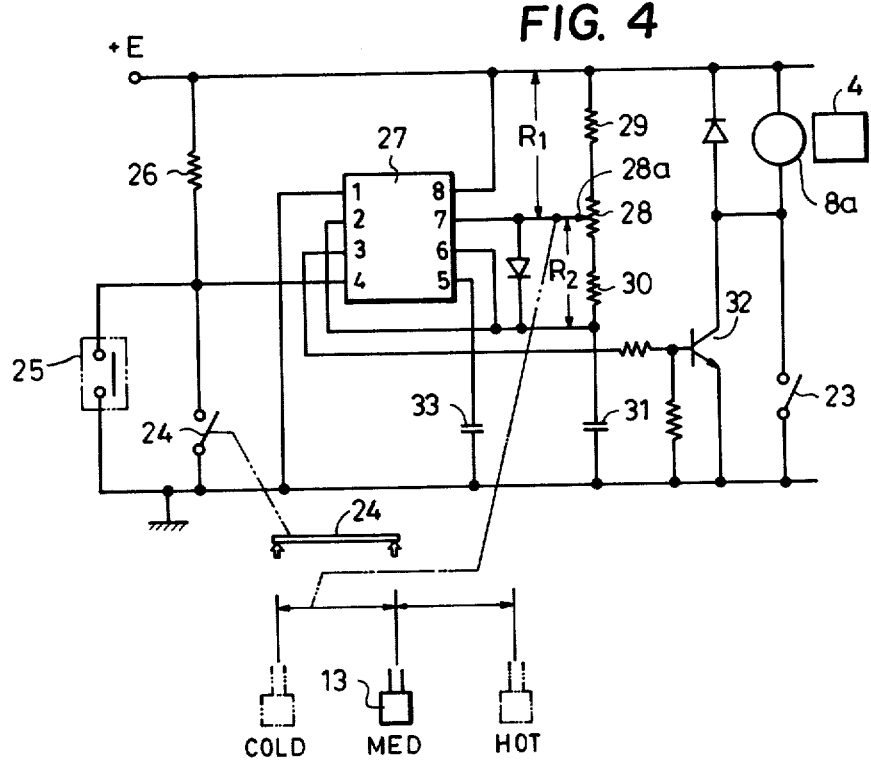
FIG. 4 is a circuit diagram of the compressor-operation control circuit used in the system of FIG. 1.

FIG. 4 illustrates an example of the circuit for controlling the operation of the compressor 4. A resetting switch 24 and a defroster switch 25, which are connected in parallel with each other, are connected to a common resistance 26 in series between a positive voltage power source and the earth. The switch 24 is adapted to be opened when the temperature control lever 13 is positioned between the position MED and the position COLD, exclusive of the position MED, while the switch 25, which is formed of a thermo switch, is mounted, e.g., on the evaporator core 2 so as to open in response to the temperature of the evaporator core. Reference numeral 27 designates a timer IC. In this embodiment, an IC Model SE/NE555 produced by Signetics Corporation, U.S.A. or its equivalent is used as the timer IC 27. The junction of the resistance 6 and the switch 25 is connected to the reset terminal 4 of the timer IC 27. Connected between the positive voltage power source and the earth is a series circuit formed of a variable resistor 28, resistances 29, 30 and a capacitor 31. The variable resistor 28 has its slider 28a connected to the discharge terminal 7 of the timer IC 27. The output terminal 3 of the timer IC 27 is connected to the base of an output transistor 32 of the NPN type which in turn has its collector connected in series to the solenoid 8a of the magnetic clutch 8 on the compressor 4, with its emitter grounded. The aforementioned dehumidifying switch 23 is connected in series to the solenoid 8a of the magnetic clutch 8. The timer IC 27 has the trigger terminal 2 and the threshold terminal 6 connected to the junction of the resistance 30 and the capacitor 31, the earthing terminal 1 grounded, the power supply terminal 8 connected to the positive voltage power source, and the control terminal 5 grounded via a capacitor 33, respectively. The temperature control lever 13 is connected to the variable resistor 28 for movement together with the slider of the latter in such a manner that the resistance value R1 provided by the resistance 29 and part of the resistor 28 increases and the resistance value R2 provided by the resistance 30 and the other part of the resistor 28 decreases, as the lever 13 is moved toward the position COLD from the position MED.

Figure 5:
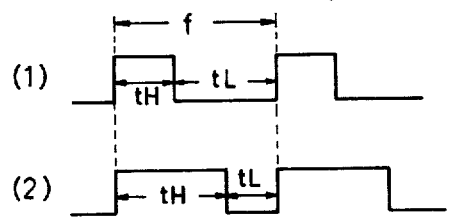
FIG. 5 is a graph showing output pulses of the compressor-operation control circuit of FIG. 4 for driving the compressor.

FIG. 5 illustrates examples of output pulses of the timer IC 27. FIG. 5 (1) represents an output pulse waveform available when the temperature control lever 13 is positioned near the position MED, and FIG. 5 (2) an output pulse waveform available when the lever 13 is positioned near the position COLD, respectively. In FIG. 5, symbol tH represents a pulse width, tL a pulse base width, and f a pulse repetition frequency which represents 1/(tH+tL) and is constant. As is noted from the graph, the pulse width tH increases as the lever 13 becomes closer to the position COLD so that the pulse duty factor $U=tH/tP$ increases (tP=the pulse repetition period). The values of the pulse width tH and the pulse base width tL are determined by equations $tH=0.7R1C$ and $tL=0.7R2C$, provided that R1 is the sum of the values of the resistance 29 and part of the resistor 28, R2 the sum of the values of the resistance 30 and the other part of the resistor 28, and C the value of the capacitor 31. The values of R1, R2 and C are predetermined so that the pulse width tH assumes a maximum value, e.g., usually approximately 20 seconds whereby the compressor 4 is continuously driven without a break, when the lever 13 is set at the maximum cooling position COLD, whereas it assumes a value of approximately 10 seconds when the lever 13 is positioned at the middle point between the position MED and the position COLD.

The transistor 32 is turned on by an output pulse tH supplied from the timer IC 27 to cause energization of the solenoid 8a of the magnetic clutch 8 to actuate the compressor 4.

With the above arrangement, to carry out heating operation, the mode control lever 22 is set at the heater position HEAT so that the mode change-over door 18 is pivotally displaced to open the floor air outlet 20. At the same time, the temperature control lever 13 is moved to a suitable position on the side of the position HOT with respect to the position MED so that the resetting switch 24 in FIG. 4 is closed to reset the timer IC 27 which then produces no output pulse. On this occasion, control of the discharge air temperature is automatically carried out in response to a change in the angular position of the air-mix damper 11 which is proportional to a change in the position of the lever 13. In this heater mode, the cock 10 in FIG. 1 may be rotated in synchronism with the movement of the lever 13 to control the flow rate at which cooling water is recirculated within the heater core 3, if required. In this case, the manner of flow rate control may be such that when the lever 13 is between the position MED and the position HOT, the cock 10 is opened, while the lever 13 is between the position MED and the position COLD, the cock 10 is closed.

When the temperature control lever 13 is set at the intermediate position MED, the resetting switch 24 is closed to reset the timer IC 27 so that the compressor 4 becomes inoperative, while simultaneously the air-mix damper 11 is set at the maximum heating position HOT to close the inlet of the heater core 3. That is, on this occasion neither heating nor cooling is carried out but only ventilation is carried out by means of the blower 7.

On the other hand, to perform the cooling operation, the mode control lever 22 is set at the cooler position A/C so that the mode change-over door 18 is pivotally displaced to open the upper air outlet 19, and simultaneously the temperature control lever 13 is displaced to a suitable position on the side of the maximum cooling position COLD with respect to the intermediate position MED. By so setting the lever 13, the resetting switch 24 in the circuit of FIG. 4 is opened (at this time, the defroster switch 25 is usually opened, too) to set the timer IC 27. Then, the timer IC 27 supplies output pulses with a pulse width depending on the values of R1, R2 as a function of the position of the lever 13 as previously mentioned, to control the rate of operation of the compressor 4, thus carrying out control of the discharge air temperature. During this cooling operation, the air-mix damper 11 is always held at the maximum cooling position a.

Figure 6:
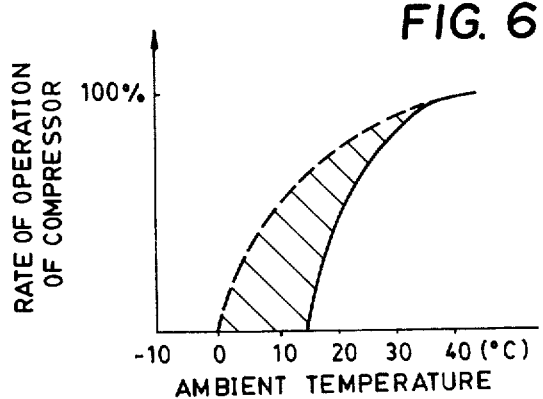
FIG. 6 is a graph showing the relationship between the ambient temperature and the rate of operation of the compressor.

Since control of the refrigerating capacity of the air conditioning system is performed through control of the rate of operation of the compressor as noted above, the rate of operation of the compressor according to the system of the present invention can be reduced to a lower value than that according to the prior art system by the hatched region in FIG. 6, in order to obtain an ideal compartment temperature of approximately 25° C. with respect to the ambient temperatures.

During the cooling operation, the defrosting operation can also take place by the action of the defroster switch 25 together with the aforedescribed temperature control in a manner similar to that employed in the conventional system, that is, when the evaporator temperature drops to a predetermined value (e.g., 0°-2° C.), the defroster switch 25 is opened to interrupt the operation of the compressor.

Obviously many modifications and variations of the present invention are possible in the light of the above description. It is therefore to be understood that within the scope of the appended claims in the invention may be practiced otherwise than as specifically described.

What is claimed is:

1. An air conditioning system for automotive vehicles, which comprises:
   a casing having an air passage formed therewithin;
   an evaporator core arranged in said air passage;
   a compressor operatively connected to said evaporator core;
   a heater core arranged at a location downstream of said evaporator core in said air passage;
   a passage bypassing said heater core;
   a pivotally mounted air-mix damper for guiding an air flow from said evaporator core, through said by-pass passage alone at a first angular position thereof, through said heater core alone at a second angular position thereof, and through both said by-pass passage and said heater core at a position between said first angular position and said second angular position;
   a temperature control lever disposed for pivoting between a first extreme position thereof and a second extreme position thereof with a predetermined intermediate position provided between said first and second extreme positions, temperature control lever being operatively connected to said air-mix damper;
   said air-mix damper being adapted to be pivotally displaced between said first angular position and said second angular position as said temperature control lever is moved between said predetermined intermediate position and said first extreme position, and said air-mix damper being adapted to be always held at said first angular position when said temperature control lever is moved between said predetermined position and said second extreme position; and
   compressor-operation control means operatively connected to said temperature control lever for controlling the operation of said compressor, said compressor-operation control means being adapted to be kept inoperative to keep said compressor at rest when said temperature control lever is positioned between said predetermined intermediate position and said first extreme position, and said compressor-operation control means being adapted to vary the rate of operation of said compressor with movement of said temperature control lever between said predetermined intermediate position and said second extreme position, said compressor-operation control means comprising:
- a magnetic clutch having a solenoid and coupled with said compressor;
- an output transistor coupled to said solenoid for energizing said solenoid;
- a timer formed by an integrated circuit for supplying pulses to said output transistor for turning said output transistor on or off;
- a resetting switch operatively connected to said timer and to said temperature control lever for rendering said timer inoperative when said temperature control lever is positioned on the side of said first extreme position with respect to said predetermined intermediate position; and
- a time constant circuit operatively connected to said temperature control lever for varying the duty factor of pulses from said timer with movement of said temperature control lever between said predetermined intermediate position and said second extreme position.

2. The air conditioning system for automotive vehicles as claimed in claim 1, including a dehumidifying switch operatively connected to said solenoid of said magnetic clutch, said dehumidifying switch being operable upon closure thereof to energize said solenoid to actuate said compressor for dehumidifying action, irrespective of the position being then assumed by said temperature control lever.

3. The air conditioning system for automotive vehicles as claimed in claim 1, including an inlet pipe connected to said heater core for introducing thermal medium thereinto; and valve means provided in said inlet valve; said valve means being operatively connected to said temperature control lever for varying the flow rate of said thermal medium being introduced into said heater core through said inlet pipe in response to a change in the position temperature control lever.

4. The air conditioning system for automotive vehicles as claimed in claim 3, wherein said valve means completely closes said inlet pipe when said temperature control lever is positioned between said predetermined intermediate position and said second extreme position.

5. The air conditioning system for automative vehicles as claimed in any one of claims 1, 2, 3 or 4, including a thermo switch responsive to a predetermined temperature of said evaporator core to render said timer inoperative during a cooling operation.

* * * * *